Feb. 8, 1938.　　　O, MUELLER　　　2,107,899

MANUAL CONTROL FOR AUTOMOBILE GENERATORS

Filed June 6, 1935

INVENTOR.
Otto Mueller
BY
ATTORNEYS

Patented Feb. 8, 1938

2,107,899

UNITED STATES PATENT OFFICE 2,107,899

MANUAL CONTROL FOR AUTOMOBILE GENERATORS

Otto Mueller, Dearborn, Mich.

Application June 6, 1935, Serial No. 25,278

2 Claims. (Cl. 171—324)

The present invention relates to manual means, operable from a point located on the dash of an automotive vehicle, for regulating the output of an electric generator operated by the engine of the vehicle.

The primary object of the invention is to provide means whereby the operator of an automotive vehicle may regulate the output of an electric generator mounted on the vehicle engine without leaving the driver's seat. This invention makes it possible for the operator to quickly and conveniently regulate the output of the electric generator so as to step up the output when the load on the battery is heavy and to step it down when the load is light and thus to avoid excessive draining or overcharging of the battery. The invention, therefore, makes it possible to quickly and easily adapt the generator output to varying conditions such as, for example, when the vehicle lamps are illuminated continuously, when a radio is being operated, or when the lamps and radio are both inoperative.

With the above and other ends in view the invention consists in matters hereinafter more particularly pointed out with reference to the accompanying drawing, in which—

Figure 1:
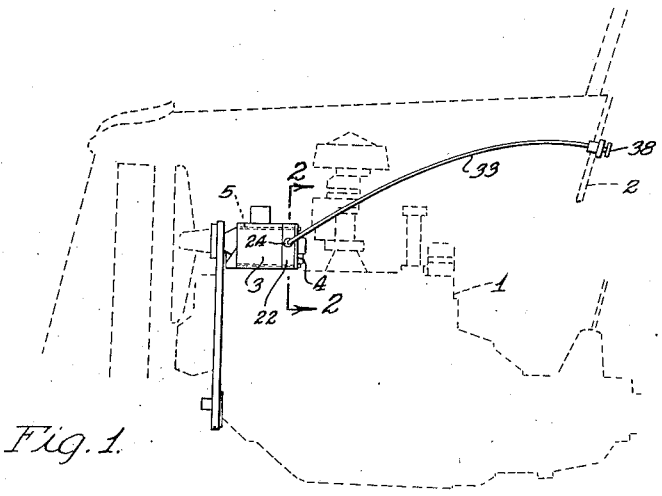
Figure 2:
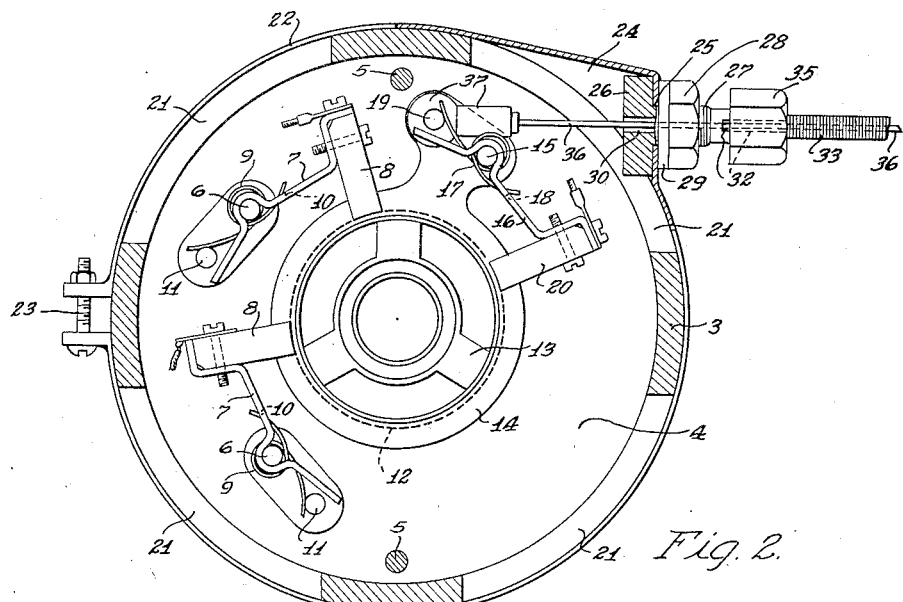
Figure 3:
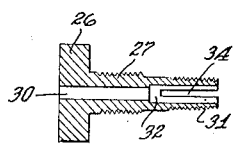

Figure 1 is an elevation of an electric generator and the present control means, Fig. 2 is a cross section taken on the line 2—2 of Figure 1, and Fig. 3 is a cross section of the head 26 taken therethrough at right angles to its axis shown in Fig. 2.

Like characters of reference are employed throughout to designate corresponding parts.

Inasmuch as electric generators for use on automotive vehicles are well known in the art the details of construction pertaining thereto have not been illustrated here. Such generators are known to include an armature which is revolved between the field magnets and a commutator with which brushes contact and through which the generated current flows. By way of example the present case illustrates a brush arrangement wherein two brushes are mounted on stationary elements on a part of the generator housing while a third brush is mounted on a supporting element carried by a member which is rotatable with respect to the said housing part so that the relationship of the third brush to the other brushes may be changed.

Referring to the drawing the numeral 1 designates the dotted outline of an automotive vehicle engine and 2 the dash. Supported on the engine is an electric generator housing 3 having an end plate 4 removably secured thereto by bolts 5. On the plate 4 are provided stationary pins 6, perpendicular with respect to the plate, and on each pin is a rocker arm 7 supporting a brush 8. A spring 9 is sleeved around each pin 6 and has one end engaging a rocker 7 at 10 and its other end engaging a stationary pin 11 to urge the brush, on its respective arm, into engagement with the commutator. For the sake of clarity and brevity the commutator and armature of the generator are not illustrated in the drawing because they form no part of the invention. However, the circumference of the commutator is indicated in Fig. 2 by the dotted line 12 and the springs 9 are illustrated as holding the brushes 8 in contact therewith.

Rotatably supported on a structure designated 13 is an annular element 14 carrying a pin 15, stationary and perpendicular with respect thereto, upon which is mounted a rocker arm 16. On the pin 15 is a spring 17 having one end engaging the rocker arm 16 at 18 and its other end engaging a pin 19 which is also fixedly positioned with respect to the annular element 14. Carried by the rocker arm 16 is a brush 20 which is normally held in contact with the commutator 12.

In accordance with the conventional practice the housing 3 is provided with a plurality of apertures 21 through which access may be had to the brushes. The apertures 21 are normally covered by a band 22 having its ends united by a bolt 23. In the present case the band 23 is bent to provide a socket 24 and is provided with an aperture 25. A fitting having a head 26 and a screwthreaded shank 27 is placed in the socket so that the shank extends thru the aperture 25. A nut 28 and washer 29 secure the fitting to the band 22. The fitting is axially pierced at 30 and has the outer end of the shank tapered and screwthreaded at 31 and in this screwthreaded part 31 is provided a bore 32 of a diameter suitable for receiving the end of a cable sheath 33. The shank is kerfed at 34 to provide flexible fingers, and a nut 35 is screwthreaded onto the tapered part 31 and compresses these fingers so that they tightly engage the end of the sheath 33 to retain it in the bore 32.

Extending through the sheath 33 is a wire 36 having one end attached to a bracket 37 which is received on the pin 19. The other end of the sheath 33 is connected to the dash 2 and the other end of the wire 36 has a handle part 38 by means of which the wire 36 may be manually moved.

In operation, when the necessity arises for varying the output of the generator the wire 36 is manually moved to and imparts rotative movement to the annular member 14 with the result that the position of the brush 20 is changed with respect to the brushes 8.

Although a specific embodiment of the invention has been shown and described it will be understood that various changes may be made within the scope of the appended claims without departing from the spirit of the invention, and such changes are contemplated.

What I claim is:—

1. In combination with an electric generator comprising a housing having an opening and a brush support swingable about an axis, means for imparting swinging movement to said brush support, said means comprising a member having means for clamping the same on said housing, a Bowden wire comprised of a flexible sheath and a flexible element slidable therein, means on said member permanently securing the end of the sheath thereto with the flexible element projecting through the opening in said housing tangent to the arc of swinging movement of said brush support, and means on the end of said flexible element connecting the same to said brush support.

2. In combination with an electric generator comprising a housing having an opening and a brush support swingable about an axis, means for imparting swinging movement to said brush support, said means comprising an annular member, means for clamping said annular member on said housing, a Bowden wire comprised of a flexible sheath and a flexible element slidable therein, said annular member having a seat formation disposed in a plane substantially perpendicular to an imaginary line extending tangentially to the arc of swinging movement of said brush support, means for attaching said sheath to said seat with the sheath extending normal thereto and the flexible element extending through the opening in the housing, and means for connecting the end of said flexible element to said brush support.

OTTO MUELLER.